United States Patent [19]
Adams et al.

[11] Patent Number: 6,017,106
[45] Date of Patent: Jan. 25, 2000

[54] REMOVABLE CARRY HANDLE AND ADAPTER FOR PORTABLE COMPUTER

[75] Inventors: Don Adams; Eric S. Turner, both of Sioux City, Iowa

[73] Assignee: Gateway 2000, Inc, S. Dak.

[21] Appl. No.: 09/241,725

[22] Filed: Feb. 2, 1999

[51] Int. Cl.[7] .................................................. A47B 81/00
[52] U.S. Cl. ...................... 312/223.2; 361/683
[58] Field of Search ................................ 312/223.2, 244, 312/293.1, 222; 361/681, 682, 683, 685; 16/FOR 110.5, FOR 114 R, 422, 425, DIG. 41

[56] References Cited

U.S. PATENT DOCUMENTS

| | | | |
|---|---|---|---|
| 4,895,231 | 1/1990 | Yamaguchi et al. | 312/244 X |
| 4,941,841 | 7/1990 | Darden et al. | 439/377 |
| 5,021,922 | 6/1991 | Davis et al. | 361/380 |
| 5,036,313 | 7/1991 | Lin et al. | |
| 5,075,926 | 12/1991 | Jeong | 16/DIG. 41 X |
| 5,260,884 | 11/1993 | Stern | 364/708.1 |
| 5,293,300 | 3/1994 | Leung | 361/683 |
| 5,311,455 | 5/1994 | Ho | 364/708.1 |
| 5,452,179 | 9/1995 | Sasaki | 361/685 |
| 5,563,767 | 10/1996 | Chen | 361/685 |
| 5,606,519 | 2/1997 | Viletto | 361/685 |
| 5,633,782 | 5/1997 | Goodman et al. | 361/683 |
| 5,694,290 | 12/1997 | Chang | 361/685 |
| 5,721,668 | 2/1998 | Barrus et al. | 361/683 |

*Primary Examiner*—Peter M. Cuomo
*Assistant Examiner*—James O. Hansen
*Attorney, Agent, or Firm*—Laurence R. Letson; Anthony Claiborne

[57] ABSTRACT

An easily and conveniently attachable/detachable carrying handle and insert is disclosed which may be used with a portable computer. The insert has a retention member and is engageable by a latch mechanism of the computer housing and may be attached to the computer housing or substituted for a removeable device bay unit.

6 Claims, 2 Drawing Sheets

REMOVABLE CARRY HANDLE AND ADAPTER FOR PORTABLE COMPUTER

FIELD OF INVENTION

The present invention relates to portable or laptop computers and more specifically to a handle insert to carry them.

BACKGROUND OF THE INVENTION

Portable, laptop or notebook computers are well known in the art. The portable computer's use and commonality has increased dramatically in today's society, as their size and weight allow individuals to carry with relative ease a computer and its vast amounts of stored information. Portable computers and the large capacity of their hard disk drives allow their users to avoid carrying one or more floppy disks with them to another location, risking the possibilities of loss or damage to the disks during transportation, that the second computer does not have the correct or adequate software to retrieve the information from the disk, as well as potential spread of computer viruses.

The capabilities and programs of the personal computer in today's workplace enable their users to perform a wide variety of tasks. Accordingly some users rely on their portable computers for everyday activities ranging from the simple to the complex. To some, personal computers have led to a nearly paperless work environment, including replacing such mundane tasks as taking notes by pen and paper with their portable personal computers. These reliances have created and then necessitated the advancement and/or improvement of the portable or laptop computer.

With this advancement, the number of accessories available for portable computers is also increasing rapidly. Two main concerns with the transportation of portable computers are their weight and ease or convenience of transport. Although the two concerns are interrelated, ease of transportation also includes factors such as does it have its own means for carrying, for example a self-contained handle, or does the computer require a carrying case?

The marketplace provides several models of computer cases designed to protect the computer during transit and which provide a handle or shoulder strap to carry the bag. However, these cases often are bulky and require the user first to remove plugs and cords from the computer, secure it properly within the case, and finally to close the case before transporting. This disassembly and securing in a carrying case is inconvenient and if not accomplished for each move of the computer, the risk increases that the computer may dropped if the user attempts to carry other items in his hands simultaneously.

Although other portable computers have built-in handles, those usually extend from the back of the computer or from a battery that extends across the back of the computer. In both of these instances, the handle is usually large and bulky, adds more weight than is necessary, is permanently attached or not easily removable, and/or may interfere with docking station use. In the ever advancing technological state, computer manufacturers are not only reducing the size and weight of the computers but also the size and weight of the batteries. New device bay designs allow insertion within the computer housing through side or device bays and are no longer restricted to the back of the computer. Current designs of a portable computer commonly omits a carry handle. This leaves the user without a handle by which to carry the computer, resulting in either the need for a portable computer carrying case or in the user using or devoting at least one and possibly both hands to carry the computer, thereby reducing or eliminating their ability to carry papers, files or other objects. The user of one of these portable computers without handles finds it almost necessary to use a carrying case especially if other items need to carried at the same time.

Prior art also reveals handles in relation to disk drives on portable computers. However, these handles are used to pull/insert disk drive drawers into and out of device bays in the computer housing.

OBJECTS OF THE INVENTION

It is an object of the present invention to provide a means for carrying portable computers equipped with removable device bay units.

It is an object of the present invention to provide a carry handle for a portable computer while at the same time eliminating any non-essential weight from the computer for a temporary period.

It is another object of the present invention to provide an alternative method of transporting a portable computer without the need for a computer bag or carrying case.

It is a further object of the present invention to provide an easily and conveniently attachable/detachable handle to assist in carrying those portable computers which were designed without handles or without handles intended for carrying.

SUMMARY OF THE INVENTION

The present invention provides both a solution to the need for a small lightweight handle and the ability to attach the handle to a port normally used by a device bay unit such as the 3.5" floppy disk drive. First, it provides a small handle for carrying the portable computer without the bulkiness and weight associated with those of the prior art. Secondly, in many instances the user does not need or require the protection of a carrying case or the use of the computer's floppy disk drive or other device bay unit and would like to take their computer with them without packing their computer in a carrying case.

Once a device bay unit is removed from the device bay and the invention inserted in its place, the computer is easily carried by the handle on the unit. Removing the floppy disk drive, an example of a device bay unit, will significantly reduce the weight of the computer without detrimentally effecting its operation. Additionally, the handle would be located such that the computer is balanced and will allow the user to comfortably and easily transport it with less than a full hand.

A carrying handle which has a insert is readily attachable or detachable from a device bay of a portable computer housing. This handle can be made of high strength plastic and may be injection molded to provide the strength and rigidity necessary to support the weight of the computer. The base insert has a configuration which is engaged and latched to secure the base insert to the computer housing to prevent the computer from falling while it is being carried by the handle. The base insert may also have a positioning member which insures proper positioning of the insert prior to latching; once the handle is attached, the positioning member also functions as a support member which helps prevent the computer from falling.

The insert is provided with a handle which is used for carrying.

A better and more complete understanding of the invention may be garnered from the drawings and detailed description of the preferred embodiment of the best mode of the invention as contemplated by the inventors.

DETAILED DESCRIPTION OF THE BEST MODE OF THE PREFERRED EMBODIMENT OF THE INVENTION

Figure 1:
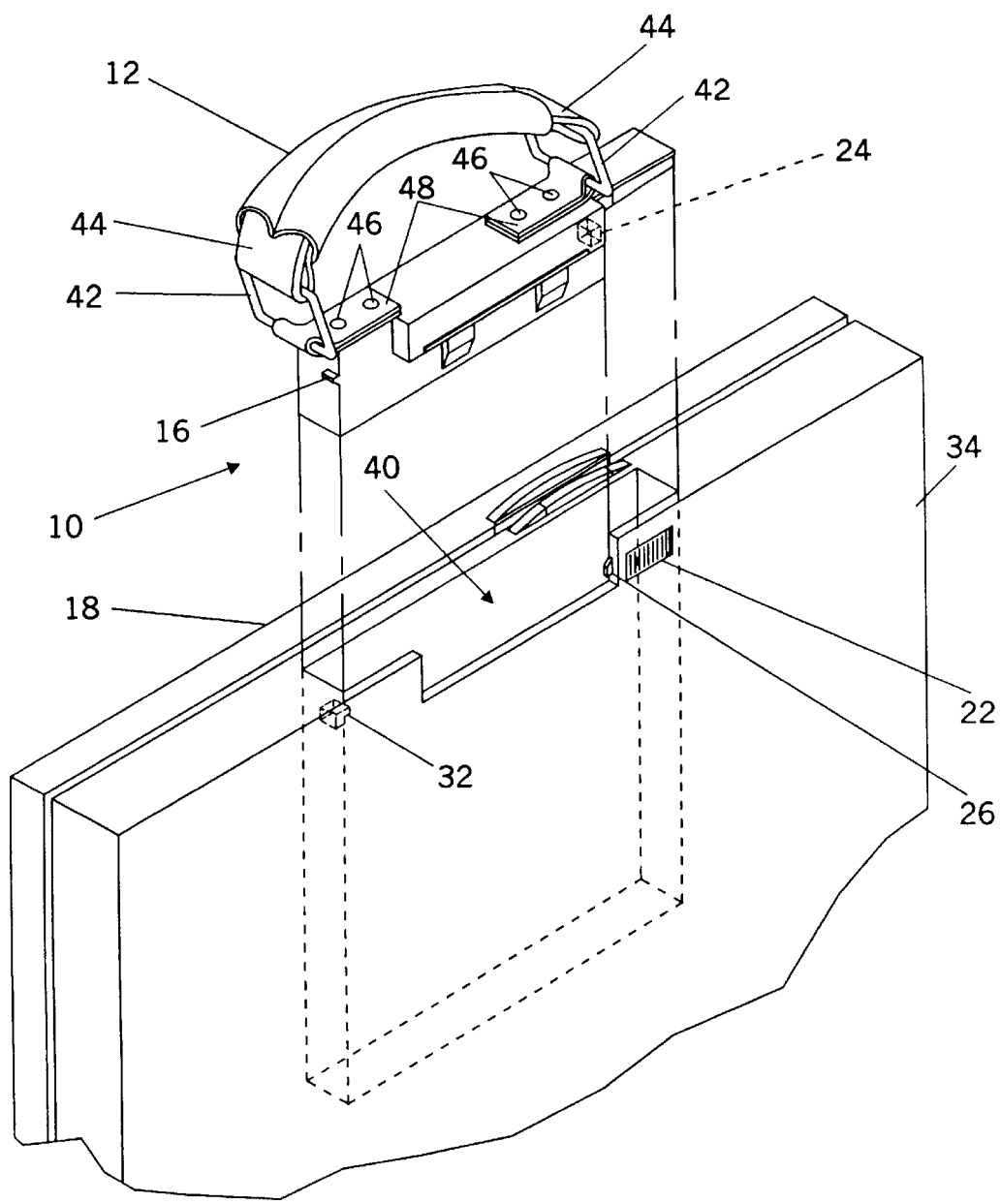
FIG. 1 is a perspective view of a portable computer housing with a device bay unit removed and a carry handle insert exploded out of the computer housing.
Figure 2:
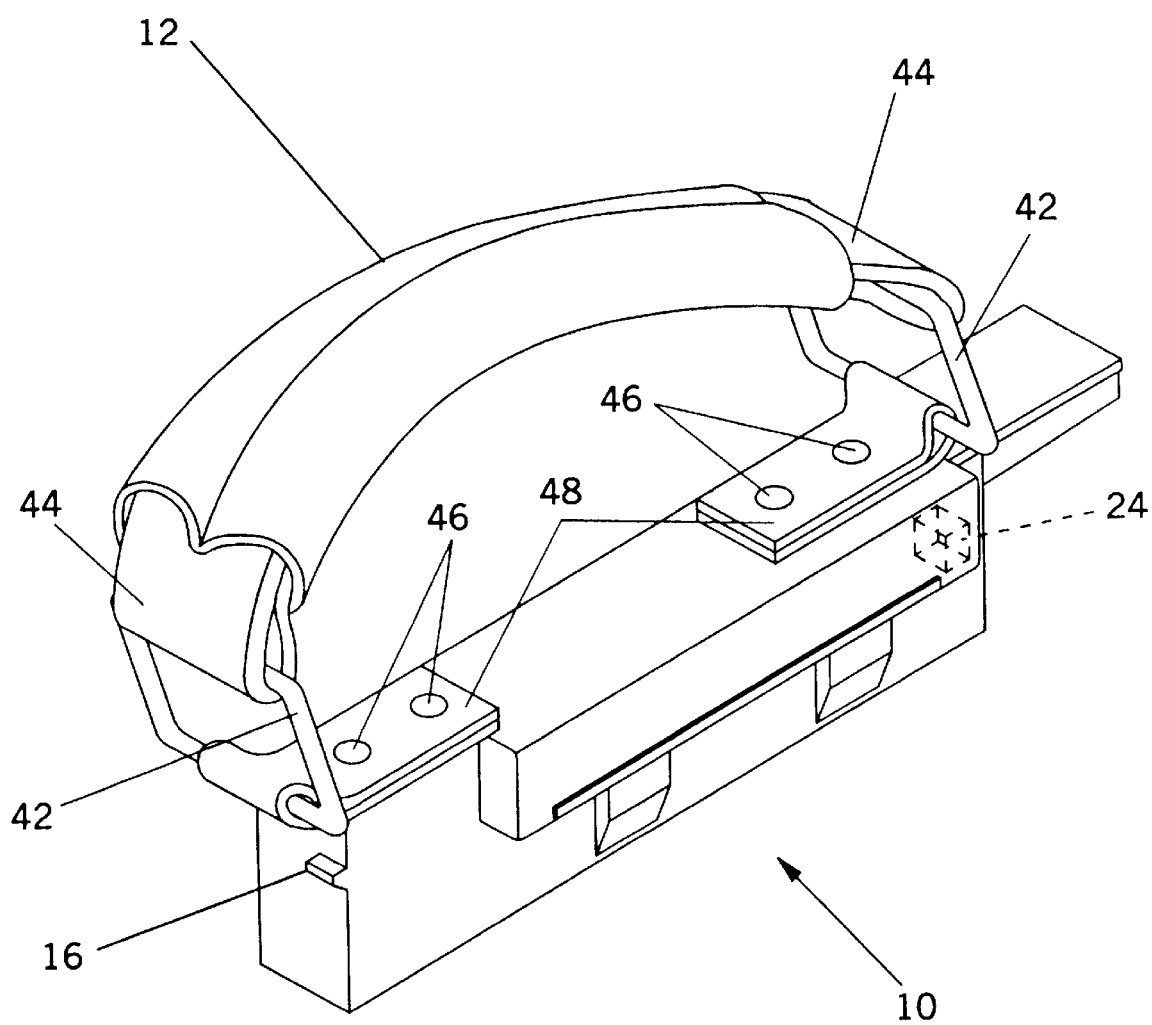
FIG. 2 is a perspective view of the carry handle attachment.

As illustrated in FIGS. 1 and 2, the device bay 40 utilized in this invention, the preferred embodiment, may accommodate a floppy disk drive or another peripheral unit. In this instance, the disk drive (not shown) is the preferred device bay because it is centrally located on the front panel 34 of the computer housing 18 and resultingly will contribute to balancing the weight while the computer is being carried by the device bay insert 10 and handle 12. However it should be understood by one skilled in the art that a compact disk drive port, a battery port, a sound board port, or any other removable device bay could be used or be substituted for the location of the floppy disk drive carry handle insert described in the preferred embodiment discussed. Moreover, the floppy disk drive port is preferred because the computer will operate without the floppy disk drive being installed.

The illustration in FIG. 2 shows an insert 10 having a handle 12. Insert 10 also has a portion 24 which allows the insert 10 and handle 12 to be inserted into and latched into a device bay 40 of a portable computer housing 18.

In FIG. 2, the insert 10 also has a positioning and retaining member 16. This positioning and retaining member 16 is insertable into the device bay 40 and engaged with retaining surface 32 illustrated in FIG. 1, in the device bay 40 of the computer housing 18 by disposing the positioning and retaining member 16 under retaining surface 32, and then rotating the insert 10 clockwise to fully position insert 10 for latching. Positioning and retaining member 16 interferes with the surface 32.

Latch 26, an extension of sliding member 22, is engageable with receiver cavity 24 to latch or retain insert 10 in place. Once the insert 10 is correctly installed, positioning and retaining member 16, retaining surface 32, latch 26, and receiver cavity 24 all act to prevent the computer 18 from separating from the insert 10 while the computer 18 is being carried or supported by handle 12. Additionally, due to the retention function of positioning member 16, it is necessary that only one latch 26 be provided.

In an alternative embodiment should insert 10 not have positioning and retaining member 16, it would be necessary for insert 10 to have two or more receiver cavities 24 preferably positioned on opposite ends of insert 10. The computer housing similarly would be provided with two or more cooperative latches 26.

Retention or receiver cavities 24 cooperate with latches 26. Latch 26 extends into cavity 24 to prevent movement of insert 10 relative to computer 18. Unless latch 26 is withdrawn and insert 10 is pivoted counterclockwise to relieve interference, surface 32 engages and interferes with positioning member 16 and prevents outward passage of positioning member 16 and thus insert 10.

In FIG. 1, the latch mechanism 26 has a finger engageable sliding member 22. Sliding member 22 is disposed in the wall 34 of the computer housing 18.

One skilled in the art will recognize that the positioning of the components of any retention mechanism are reversible, in that the receiver cavity 24 could be positioned in computer housing 18 and sliding member 22 and latch 26 accordingly positioned on the inserts 10 and device bay units (not shown).

Handle 12 may be a separate piece from insert 10 and may be attached at a later step in the assembly or handle 12 and insert 10 may be made with the insert as one piece handle, fabricated of a high strength injection molded plastic, or separately of leather, rubber or other suitable material. A rigid metal insert may also be attached or inserted into the injection molded structure of insert 10 to provide additional strength.

The handle 12 may be attached by way of flexible strap 44, rings 42 to straps 48 which are riveted to the insert 10 by rivets 46. Alternatively, the insert 10 may be molded to accommodate the rings 42, or to provide further direct attachment of a handle 12.

Latch design 26 can be any one of several available in the market place. The preferred embodiment illustrates one that has been found to be very common to latch peripheral units and very reliable.

This invention may be used in providing an attachable/removeable carry handle for containers of various types having a device bay and an insertable removeable device therein.

The foregoing description of preferred embodiments of the invention is presented for purposes of illustration and description and is not intended to be exhaustive or to limit the invention to the precise form disclosed. Without departing from the spirit of the invention, it is also recognized that many variations of the particular apparatus disclosed will occur to one skilled in the art. It is to be understood that the invention is not limited to the precise embodiment disclosed, and that various changes and modifications may be effected therein without departing from the scope or spirit of the invention. Accordingly, the invention is to be deemed limited only by the scope of the appended claims.

We claim:

1. A container transporting sytem comprising:

a portable container;

said portable container having at least one device bay for accepting a device optionally used with said container;

a device bay insert disposable and mateable into a portion of the device bay;

opposed, complementary, engageable retaining surfaces disposed on the device bay insert and within the device bay;

at least one latch disposed to extend between the device bay insert and the portable container and into the insert;

the device bay insert comprising a cavity for accepting a portion of the latch; and the device bay insert having a handle attached hereto, whereby the device bay insert may be retained inside the device bay and the container carried by the handle.

2. The container transporting system of claim 1 wherein the opposed complementary retaining surfaces further comprises a positioning member engageable with an interferring retaining surface for resisting the removal of the device bay insert from the device bay.

3. The container transporting system of claim 1 wherein the at least one latch comprises a reciprocal member and finger engageable member for reciprocating the reciprocal member.

4. A container transporting system for carrying a portable computer comprising:

a portable computer housing defining a cavity conformed to mate with an insert, the cavity defining a retaining surface;

a handle;

said insert conformed to mate with at least a portion of the cavity in said portable computer housing and attached to the handle;

at least one retaining member extending from at least one surface of the insert, for engaging the retaining surface;

the insert comprising a receiving cavity;

the portable computer housing comprising an extendible bridging member disposable into the receiving cavity and bridging between the insert and the portable computer housing;

the handle positioned and secured to an external portion of the insert, whenever installed in the cavity.

5. The container transporting system of claim 4 wherein the insert has a positioning member opposite to and engageable with the retaining surface.

6. The container transporting system of claim 5 wherein the extendible bridging member is a latch disposed in the computer housing and engageable with the insert for retaining the insert in the cavity of the portable computer housing.

* * * * *